United States Patent [19]

Holum

[11] Patent Number: 4,755,705

[45] Date of Patent: Jul. 5, 1988

[54] PIEZOELECTRIC MOTOR

[76] Inventor: Mark J. Holum, 14201 Hancock Dr., Anchorage, Ak. 99515

[21] Appl. No.: 61,480

[22] Filed: Jun. 15, 1987

[51] Int. Cl.[4] .............................................. H01L 41/08
[52] U.S. Cl. .................................... 310/328; 310/317; 310/323
[58] Field of Search .................. 310/317, 323, 328, 82

[56] References Cited

U.S. PATENT DOCUMENTS

| 4,400,641 | 8/1983 | Vishnevsky et al. | 310/323 |
| 4,453,103 | 6/1984 | Vishnevsky et al. | 310/323 |
| 4,645,964 | 2/1987 | Hiramatsu | 310/323 |

Primary Examiner—Mark O. Budd
Attorney, Agent, or Firm—Christensen, O'Connor, Johnson & Kindness

[57] ABSTRACT a piezoelectric motor providing either continuous or incremental angular rotary motion of one or two shafts.

In a first embodiment, the piezoelectric motor includes two disks (16, 18) mounted onto rotatable shafts (12, 14). A plurality of piezoelectric elements (32) are disposed in a plurality of radially aligned slots (33) around the circumferential edge of one of the disks. A rotary switch assembly (20) is operative to energize a selected piezoelectric element (38) causing it to radially expand, thereby forcing each of the disks to rotate in opposite directions. In a second embodiment, both of the disks include the piezoelectric elements around their circumferential edge. In a third embodiment, piezoelectric plates (68) are stacked circumferentially in slots (66) around the circumferential edge (70) of one of the disks and are selectively actuated so that the center of the selected piezoelectric element is caused to bow radially outward, causing the two disks to rotate in opposite directions. In a fourth embodiment, actuation of the selected piezoelectric element causes a crankarm (86) to turn as a thrust disk (88) rotates about the circumferential edge of a fixed driver disk (82).

21 Claims, 3 Drawing Sheets

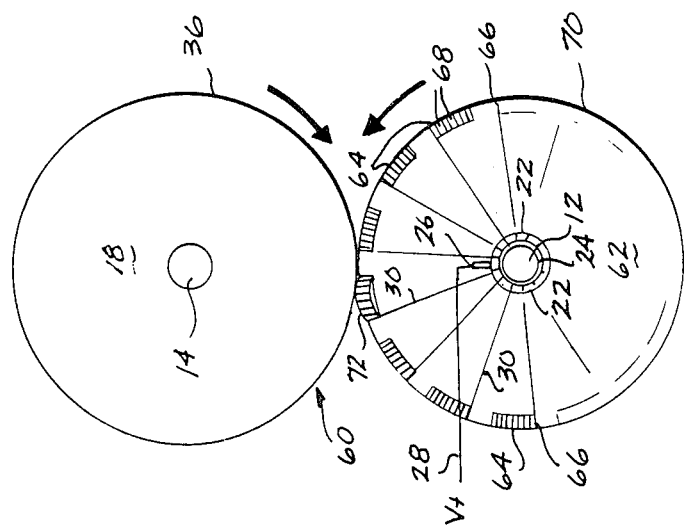
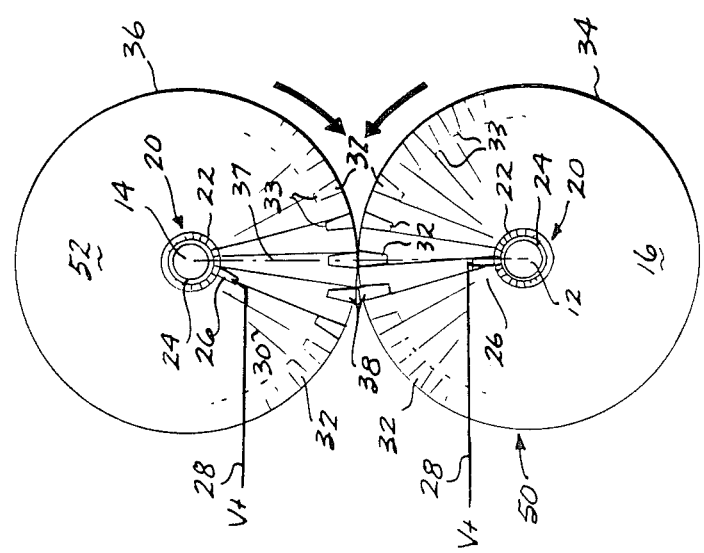

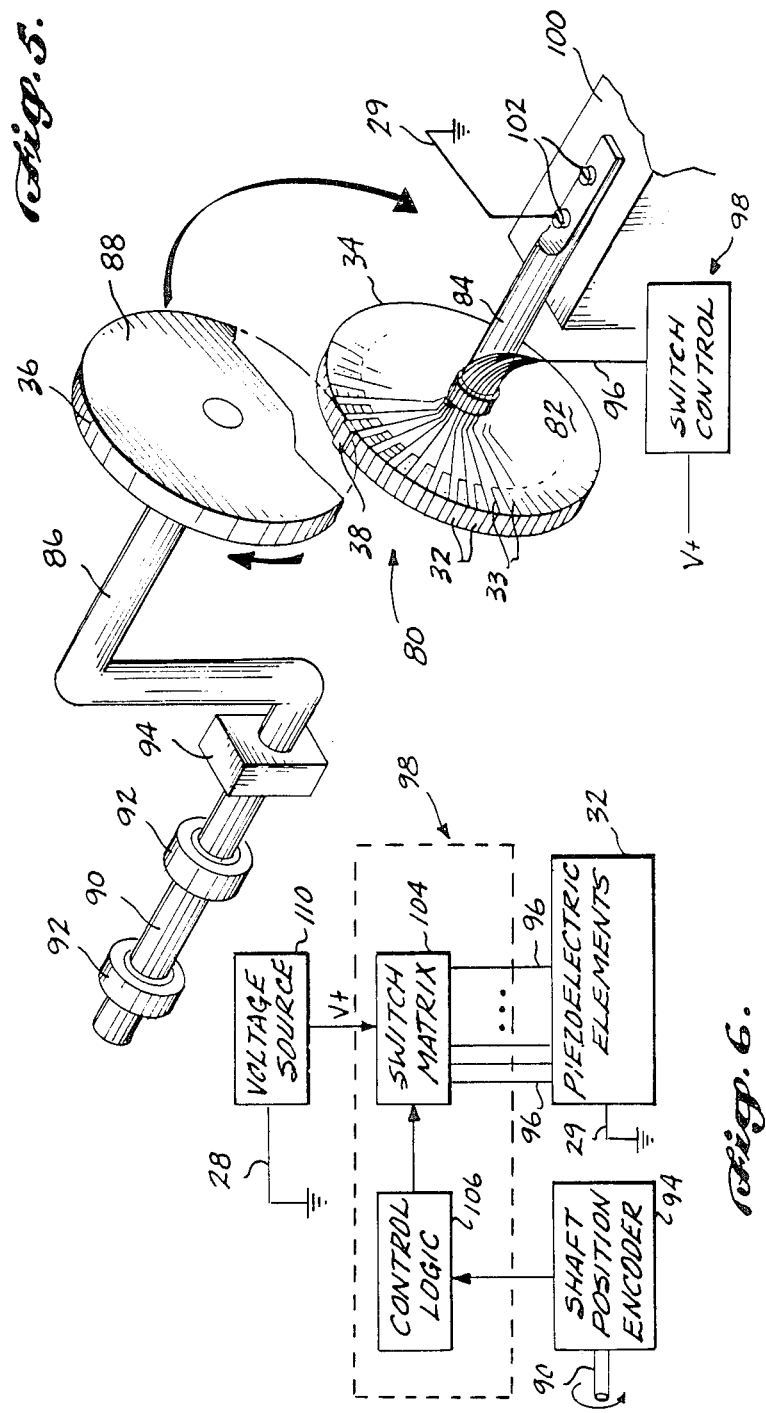

PIEZOELECTRIC MOTOR

TECHNICAL FIELD

The present invention generally pertains to a device for converting electrical energy into rotary motion and, more specifically, to a motor wherein an applied electric potential causes a piezoelectric element to change dimension, thereby producing a driving torque to rotate a shaft.

BACKGROUND INFORMATION

Precision rotary actuators are used in applications where there is a requirement to rotate a shaft through a precisely defined angular increment. For example, an electronic camera having full automatic capability may require a rotary actuator to adjust the f-stop, another to advance the film, and a third to focus the lens. Conventional stepping motors are frequently used to provide the precise incremental rotary motion required for applications such as this. The available power for such motors is usually limited, requiring that the motor be constructed with very efficient high impedance windings to ensure that minimal battery power is consumed. These considerations are not limited to stepping motors, but also often apply to applications wherein a continuously rotating motor is required.

As an alternative to electromagnetic motors, engineers have turned to piezoelectric technology to develop motors without windings that do not use a magnetic field to develop a rotational torque but, instead, are driven by the expansion and contraction of one or more piezoelectric elements to which an electric potential is applied. A multitude of designs for piezoelectric motors driven by an AC voltage is disclosed in U.S. Pat. No. 4,019,073. All the motors shown in this patent include a rotor and a stator, at least one of which comprise a piezoelectric vibrator for inducing rotational motion in the rotor.

Another piezoelectrically-driven motor design is disclosed in U.S. Pat. No. 4,468,583. In this design, the motor also includes a rotor and a stator. A pair of annular piezoelectric elements disposed on each side of a holding member on the stator contract and expand in the radial direction in response to an applied electrical signal, and act to alternately clamp and release the rotor. A plurality of other piezoelectric elements are disposed between the annular elements and the holding member of the stator, and are operative to rotate the rotor by causing a displacement of the annular elements in the circumferential direction, while the annular elements are clamped on the rotor.

Most of the piezoelectric motors described in the prior art apply a driving torque to rotate a single drive shaft. However, higher output torque may be achieved with a piezoelectric motor having dual counterrotating drive shafts. The dual shafts may be adapted to drive a single output shaft on which is mounted a gear commonly driven by the dual drive shafts, thereby substantially increasing the output torque of the motor. Dual counterrotating shaft also serve to minimize or eliminate reaction torque produced by rotation of a single drive shaft. Furthermore, selective engagement of one of the dual drive shafts can enable quick reversal of a driven mechanism from one direction of rotation to another. These and other advantages of a dual drive shaft motor are well known in the art, but are not efficiently implemented by prior piezoelectric motors.

SUMMARY OF THE INVENTION

In accordance with the present invention, there is provided a piezoelectric motor which includes a first and a second disk, each having a central axis. The two disks are disposed with their central axes in parallel alignment and with their circumferential edges in contact at a point lying on a line connecting the centers of the disks. At least one of the two disks is rotatable about the longitudinal axis of a shaft on which the disk is mentioned.

A plurality of piezoelectric elements are disposed in spaced apart array, inset around the circumferential edge of at least one of the first and second disks. Each piezoelectric element is connected to electrical leads through which a voltage may be applied to cause the piezoelectric element to expand radially outward beyond the circumference of the disk.

A voltage source is connected to the leads through a switch so that as the switch is closed, an actuating potential is applied to a selected piezoelectric element, causing the element to expand radially outwardly. The switch is closed when the selected piezoelectric element is offset from but proximate to the point at which the first and second disks are in contact, and the radially expanding selected piezoelectric element thus provides a thust against the other of the two disks. Since the thrust is offset slightly from the line connecting the centers of the two disks, it has a component directed tangentially of the circumferential edges of the disks, which causes at least the one disk that is rotatable to rotate with the shaft on which it is mounted.

The piezoelectric elements comprise a plurality of piezoelectric plates which are stacked either radially or circumferentially. When stacked circumferentially, the center of the selected element tends to bow laterally outward as the voltage is applied to actuate the element. Sequential expansion of the piezoelectric elements provides a force directed to rotate either one or both of the first and second disks in a continuous or incremental step progression, in either direction. In one embodiment, the switch comprises a rotary switch assembly that includes a brush and switch segments disposed on the shaft of the rotatable disk. The rotary switch assembly is similar to a commutator and serves to sequentially apply an actuating voltage to successive selected piezoelectric elements. Alternatively, the switch comprises an electronic switching matrix.

In a further embodiment of the invention, both the first and second disks rotate, thereby rotating the shafts on which they are mounted. In yet another embodiment, one of the disks is fixed and the other is rotatably mounted on a shaft that is formed into a crank arm having an axis of rotation aligned with the center of the fixed disk. As rotatable disk rolls around the entire circumference of the fixed disk, it turns the crank arm.

BRIEF DESCRIPTION OF THE DRAWINGS

FIG. 3 is an end view of an embodiment of the piezoelectric motor, wherein both the thrust and drive wheels include piezoelectric elements.

FIG. 4 is an end view of another embodiment of the present invention, wherein the piezoelectric elements comprise plates of circumferentially stacked piezoelectric material.

FIG. 5 is an isometric view of a further embodiment of the present invention wherein the drive wheel is fixed and the thrust wheel is mounted on a crank arm.

FIG. 6 is a block diagram illustrating an electronic switch for applying voltage to a selected piezoelectric element.

DISCLOSURE OF THE PREFERRED EMBODIMENTS

Figure 1:
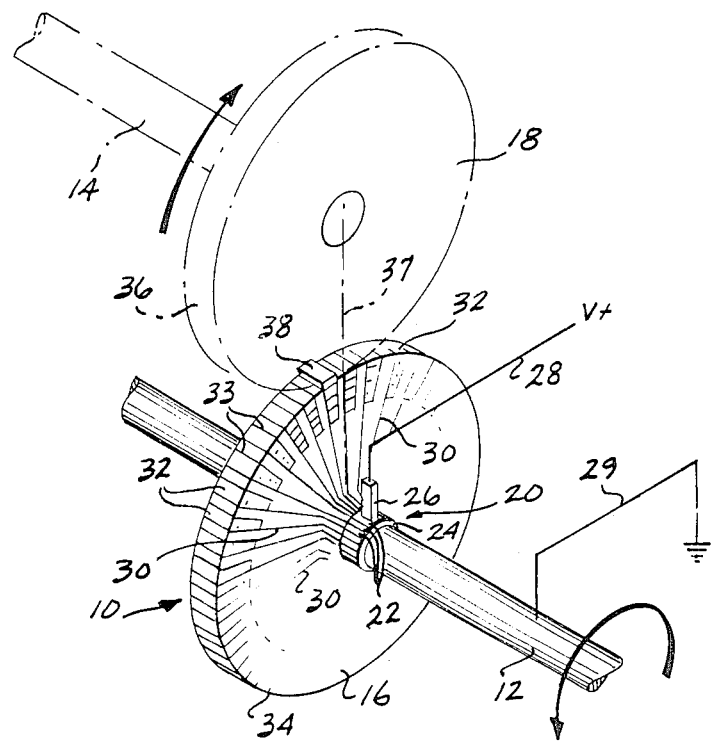
FIG. 1 is an isometric view of a first embodiment of the piezoelectric motor.

Referring to FIG. 1, a first embodiment of the piezoelectric motor is shown generally denoted by reference numeral 10. Motor 10 includes a first rotatably mounted shaft 12 having a longitudinal axis aligned in parallel with a second rotatably mounted shaft 14. A driver disk 16 is fixedly attached to first shaft 12 and is in contact with a thrust disk 18, which is likewise fixedly attached to second shaft 14.

A plurality of piezoelectric elements 32 are each disposed in radially extending slots 33 at spaced apart intervals around the circumferential edge 34 of driver disk 16. Piezoelectric elements 32 are electrically connected via leads 30 which extend radially across the face of disk 16 to a rotary switch assembly 20. Rotary switch assembly 20 comprises an annular ring including a plurality of switch segments 22, each corresponding to one of the piezoelectric elements 32. Switch segments 22 are insulated from each other and from shaft 12 by rubber insulator material 24. A carbon brush 26 is mounted at a slight angular offset from a line 37 connecting the center of shafts 12 and 14, and is biased (by a spring—not shown) against a particular one of the switch segments 22 that is electrically connected to a piezoelectric element that is just offset from the point at which driver disk 16 contacts thrust disk 18 on line 37.

Figure 2:
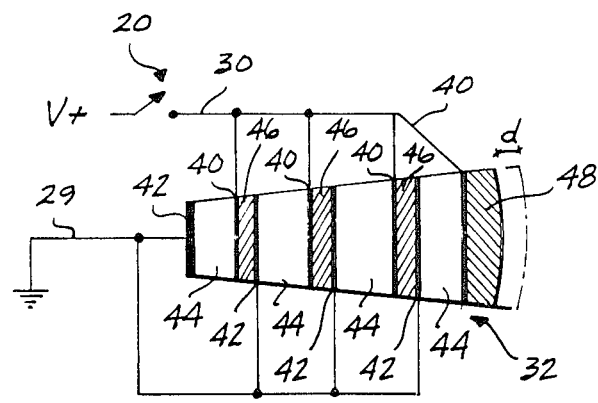
FIG. 2 is an enlarged end view of one of the piezoelectric elements.

Turning now to FIG. 2, one of the piezoelectric elements 32 is enlarged to show the details of its construction. Each piezoelectric element 32 comprises a plurality of piezoelectric plates 44 that are stacked in a radially extending direction relative to the center of disk 16. Lead 30 is connected to the radially outer surface of the piezoelectric plates 44 by conductive layers 40. The opposite or radially inner surfaces of the piezoelectric plates 44 are connected via conductive layers 42 to the ground side of the voltage source via lead 29. A radially outer cap layer 48 comprising rubber or a plastic material is optionally provided.

An insulating layer 46 separates the conductive layers 40 and 42. As shown in FIG. 1, lead 29 is electrically connected to shaft 12 by means of a carbon brush (not shown), or other suitable contact. An electrical path from shaft 12 to conductive layers 42 may be provided through conductors (equivalent to leads 30), disposed on the surface of driver disk 16 that is opposite to the surface shown in FIG. 1. Alternatively, if driver disk 16 comprises a conductive metal, current may flow directly through the disk to conductive layers 42. In the latter instance, the radially extending sides of slots 33 also may require electrical insulation from driver disk 16 to prevent short circuit current flow between layers 40 and 42.

The piezoelectric plates 44 may comprise any suitable substance exhibiting piezoelectric properties, for example, a piezoelectric ceramic; however, of the crystalline piezoelectric materials, quartz crystal is preferred. The material comprising piezoelectric plates 44 should be polarized such that an electric field applied between layers 40 and 42 causes each of the piezoelectric plates 44 to expand in the direction of the applied electric field. In the embodiment shown in FIG. 2, piezoelectric plates 44 are stacked in a radial direction, with layers 40 and 42 connected in parallel across the supply voltage V+ and ground, and it will be apparent that each of the piezoelectric plates contributes incrementally to an overall radial expansion of piezoelectric element 33 equal to the total distance "d" as the piezoelectric material is subjected to the applied potential.

Referring back to FIG. 1, a selected piezoelectric element 38 is shown after it is excited by the applied supply voltage V+, and is thus caused to expand radially outward relative to the center of driver disk 16. The angular disposition of carbon brush 26 about shaft 12 and of switch segments 22 relative to piezoelectric elements 32 determines when the supply voltage is applied to one of the piezoelectric elements as shaft 12 rotates. Optimally, the supply voltage V+ should be connected to the selected piezoelectric element 38 so that it is radially expanded when it is proximate to but slightly displaced from the point at which the circumferential edge 34 of driver disk 16 contacts the circumferential edge 36 of thrust disk 18. Radial expansion of selected piezoelectric element 38 applies a force to both driver disk 16 and thrust disk 18, having a component causing driver disk 16 to rotate in a counterclockwise direction and thrust disk 18 to rotate in the opposite or clockwise direction, as viewed from the right in FIG. 1.

As successive piezoelectric elements 33 are energized by contact of carbon brush 26 against switch element 22, driver disk 16 and thrust disk 18 continue to rotate in the above-defined directions. First and second shafts 12 and 14 are also caused to rotate since each of disks 16 and 18 are attached to the respective shafts. Reverse rotation of shafts 12 and 14 (i.e., rotation in the opposite direction) can be achieved by positioning carbon brush 26 so that it conducts supply voltage V+ to a selected piezoelectric element 38 disposed on the opposite sides of the point at which circumferential edges 34 and 36 are in contact. Alternatively, a second carbon brush may be mounted in this position, and either carbon brush 26, as shown in FIG. 1, or the second carbon brush may be energized to select the direction of rotation of driver disk 16 and thrust disk 18 with their connected shafts 12 and 14. By controlling the duration of the application of supply voltage V+ to carbon brush 26 (or to the second carbon brush), shafts 12 and 14 can be made to rotate through a desired angular increment in a stepwise manner. The smallest angular increment through which the shafts can be made to rotate corresponds to the spacing between adjacent piezoelectric elements 32. When controlled in this manner, piezoelectric motor 10 can function as a stepping motor.

The magnitude of the supply voltage V+ required to actuate the piezoelectric elements 32 will depend on the characteristics of the piezoelectric material used for the elements. A range of from 1–5 volts DC is sufficient to actuate most materials. The voltage source may be controlled to provide a supply voltage V+ as a pulse or as a continuous current depending on whether the piezoelectric motor is to rotate through an angular increment or continuously. The control for the voltage supply to accomplish these functions is not shown since that may be provided separately from the present invention and will depend on the application.

A second embodiment of the present invention is shown in FIG. 3 and is generally indicated by reference numeral 50. In this and subsequent embodiments discussed hereinbelow, the same reference numerals are used to indicate elements comprising the piezoelectric motor which are common to each embodiment. Piezoelectric motor 50 thus includes a driver disk 16 mounted on a shaft 12, having a plurality of piezoelectric elements 32 disposed in spaced apart slots 33 around its circumferential edge 34. A rotary switch assembly 20 is also disposed on shaft 12 as in the first embodiment, and includes switch segments 22 and carbon brush 26. Unlike the first embodiment, however, piezoelectric motor 50 includes a second driver disk 52 mounted on rotatable shaft 14 instead of thrust disk 18. Second driver disk 52 also includes a plurality of piezoelectric elements 32 disposed in spaced apart slots 33 around its circumferential edge 36.

Associated with second driver disk 52 is another rotary switch assembly 20 comprising switch segments 22 and carbon brush 26 as previously described. Each of the carbon brushes 26 associated with the rotary switch assemblies 20 mounted on first and second shafts 12 and 14 are disposed so that they contact a switch segment 22 corresponding to a selected piezoelectric element 38 that is proximate to but offset from a point at which circumferential edges 34 and 36 are in contact, i.e., slightly offset from a line 37 connecting the centers of first and second shafts 12 and 14. The selected piezoelectric elements 38 thus each have a voltage applied to them causing them to expand radially outward, contacting each other and thereby causing driver disk 16 to rotate in a counterclockwise direction and second driver disk 52 to rotate in a clockwise direction relative to the view of FIG. 3. It will be apparent, however, that the selected piezoelectric elements 38 could be disposed on the opposite side of the line 37 connecting the centers of first and second shafts 12 and 14 by positioning carbon brushes 26 to active the appropriate switch segments 22 corresponding to those piezoelectric elements, thereby causing both driver disks 16 and 52 to rotate in the opposite direction. Furthermore, if the voltage is applied through conductors 28 to carbon brushes 26 in a continuous fashion, driver disks 16 and 52 and their corresponding first and second shafts 12 and 14 will continuously rotate, while if the voltage is applied over a predetermined time interval, the disks will rotate through a precise angular increment corresponding to the number of piezoelectric elements 32 that are energized during that time interval.

Turning now to FIG. 4, a further embodiment of the piezoelectric motor is generally indicated by reference numeral 60. Piezoelectric motor 60 differs from the first embodiment 10 shown in FIG. 1 by the arrangement of the piezoelectric elements 64. As shown in FIG. 4, a driver disk 62 includes a plurality of piezoelectric elements 64 disposed in spaced apart slots 66 around its circumferential edge 70. Slots 66 have a relatively smaller dimension in the radial direction than do slots 33, but encompass a substantially longer circumferential segment. Each of the piezoelectric elements 64 comprise a plurality of piezoelectric plates 68 which are stacked circumferentially within slots 66. Each of the piezoelectric plates 68 include conductive layers connected to a supply voltage V+ and ground that are disposed on opposite faces of the plates, and adjacent piezoelectric plates are separated by an insulated similar to the piezoelectric elements 32 shown in FIG. 2. The conductive layers are also connected to the supply voltage V+ in a similar fashion. Thus, leads 30 are operative to convey current from switch segments 22 of a rotary switch assembly 20 disposed around first shaft 12 as a carbon brush 26 comes into contact with one of the switch segments, as previously explained. When a selected piezoelectric element 72 is actuated by the applied voltage, it tries to expand circumferentially within slot 66; however, because it is restrained within the slot, the center of the selected piezoelectric element 72 bows radially outward, coming into contact with the circumferential edge 34 of thrust disk 18, thereby causing driver disk 62 to rotate in a counterclockwise direction and thrust disk 18 to rotate in a clockwise direction. The angular position of carbon brush 26 about shaft 12 and the disposition of the switch segments 22 relative to piezoelectric elements 64 again determining when a piezoelectric element is actuated and the direction of rotation of the disk as previously explained for the first and second embodiments of the piezoelectric motors 10 and 50. Similarly, the duration over which supply voltage V+ is applied to switch segments 22 through carbon brush 26 determines whether first and second shafts 12 and 14 rotate continuously or only through a predetermined angular increment.

A fourth embodiment of the present invention comprising piezoelectric motor 80 is shown in FIG. 5. In this embodiment, a fixed driver disk 82 is fixedly mounted on a nonrotating shaft 84 that is attached to a support 100 by bolts 102 or other suitable connectors. Fixed driver disk 82 includes a plurality of piezoelectric elements 32 disposed in spaced apart radially aligned slots 33 around its circumferential edge 34. A thrust disk 88 is rotatably mounted upon a crankshaft 86 so that is circumferential edge 36 is in contact with circumferential edge 34 of fixed disk 82. Crankshaft 86 includes a portion 90 that is rotatably mounted within bearings 92 and is aligned with the center of fixed driver disk 82. A shaft position encoder 94 is mounted on portion 90 of crankshaft 86 and is operative to produce an electrical signal indicative of the angular position of crankshaft 86 as it rotates within bearings 92. Since the position of the point of contact between circumferential edges 34 and 36 relative to the position of each piezoelectric element 32 is directly dependent upon the angular position of crankshaft 86, the electrical signal produced by shaft position encoder 94 may be used to determine which element should be actuated.

Each of the piezoelectric elements 32 disposed within fixed driver disk 82 is connected by leads 96 to a switch control 98 that replaces the rotary switch assembly 20 used in the previously described embodiments. As shown in FIG. 6, a voltage source 110 is connected to ground through leads 28 and provides a supply voltage V+ to switch control 98, which comprises a switch matrix 104 and a control logic unit 106. Switch matrix 104 may comprise a plurality of transistors, relays, SCRs, or other suitable switching devices actuated by a signal from the control logic unit 106 to conduct an actuating voltage to a selected piezoelectric element 38 via conductors 96.

Control logic unit 106 is operative to determine a selected piezoelectric element 38 from the plurality of piezoelectric elements 32 based on the signal produced by shaft position encoder 94. Control logic unit 106 may, for example, comprise a microprocessor, a programmable logic array, or a circuit of discrete electronic components. The control logic unit is operative to actuate a selected piezoelectric element 38 that is disposed proximate to but slightly displaced from the point at which the circumferential edge 34 of the fixed driver disk 82 contacts circumferential edge 36 of thrust disk 88. Accordingly, thrust disk 88 is caused to rotate as the selected piezoelectric element 38 expands radially, and will continue to rotate as successive piezoelectric elements 32 are selected by application of the supply voltage V+ thereto. Rotation of thrust disk 88 causes the center of the thrust disk to describe a circular orbit about the fixed driver disk, which in turn causes crankshaft 86 to rotate within bearings 92. The direction of rotation of the thrust disk 88 (and the crankshaft) and the selection of continuous or incremental angular rotation of crankshaft 86 is determined by control logic unit 106, in conformance to the logic implemented by rotary switch assembly 20 with regard to the position of the selected piezoelectric element 38 and the duration of the applied supply voltage V+.

Piezoelectric motor 80 may be modified by interchanging driver disk 82 and thrust disk 88, i.e., by rotatably mounting driver disk 82 on crankshaft 86 and fixedly mounting thrust disk 88 on shaft 84. With this modification, the shaft position encoder 94 and switch control 98 may be replaced with a rotary switch assembly 20 mounted on portion 90 of the crankshaft. The switch segments 22 of the rotary switch assembly would then be connected by leads 30 to each of the piezoelectric elements 32 as in the first two embodiments, enabling piezoelectric motor 80 to function as previously described, except that the driver disk 82 would rotate around the thrust disk 88.

Although the present invention has been disclosed with respect to several preferred embodiments and modifications thereto, further modifications will be apparent to those skilled in the art. Accordingly, it is not intended that the invention be limited by the disclosure or by such modifications, but instead that its scope should be determined entirely by reference to the claims which follow hereinbelow.

The embodiments of the invention in which an exclusive property or privilege is claimed are defined as follows:

1. A piezoelectric motor comprising:
   (a) a first and a second disk, each having a central axis and a circumferential edge, the first and second disks being disposed with their central axes in parallel alignment, and with their circumferential edges in contact at a point, at least one of the first and second disks being rotatable about a shaft extending along its central axis;
   (b) a plurality of piezoelectric elements being disposed in spaced apart array, inset around the circumferential edge of one of the first and second disks, the piezoelectric elements each including electrical leads through which a voltage may be applied to cause the piezoelectric elements to expand radially outwardly beyond the circumference of the one disk;
   (c) a voltage source; and
   (d) means connected to the leads and to the voltage source, for sequentially applying a voltage to the piezoelectric elements causing them to expand, the voltage being applied to a selected piezoelectric element that is immediately adjacent the point at which the circumferential edges of the first and second disks are in contact, the expanding piezoelectric element contacting the circumferential edge of the other disk, causing at least the one disk that is rotatable to rotate upon its axis.

2. The piezoelectric motor of claim 1, wherein the piezoelectric elements each include a plurality of piezoelectric plates stacked in a radial direction and electrically connected in parallel.

3. The piezoelectric motor of claim 1, wherein both the first and second disks are mounted upon shafts that rotate about their central axes.

4. The piezoelectric motor of claim 3, wherein both the first and the second disks include the piezoelectric elements disposed in spaced apart array around their circumferential edges, each piezoelectric element being connected through the leads to the means for sequentially applying the voltage and operative to expand when the voltage is thus applied, causing both disks and the shafts upon which they are mounted to rotate about their central axes.

5. The piezoelectric motor of claim 1, wherein one of the first and second disks is fixed, the shaft of said one of the first and second disks that is rotatable being formed into a crank arm having an extending end rotatably mounted in alignment with the central axis of the fixed disk, the center of the rotatable disk thus describing a circular locus of points as the rotatable disk rolls around the fixed disk.

6. The piezoelectric motor of claim 1, wherein the piezoelectric elements each comprise a plurality of piezoelectric plates stacked along the circumferential edge of the one of the first and second disks, the piezoelectric plate being constrained, so that when the selected piezoelectric element tries to expand in the circumferential direction due to the applied voltage, its center bows laterally outward, in a radial direction.

7. A piezoelectric motor comprising:
   (a) a drive wheel having a central axis and including a plurality of piezoelectric elements disposed in spaced apart array around a radially outer edge of the drive wheel, each piezoelectric element having a surface generally coextensive with the circumference of the drive wheel, the surface of the piezoelectric element expanding radially outward beyond the circumference when subjected to an actuating voltage;
   (b) a reaction wheel, mounted on a rotatable shaft that extends parallel to the central axis of the drive wheel and disposed so that a point on a radially outer edge of the reaction wheel is in contact with a point on the radially outer edge of the drive wheel;
   (c) a source of voltage having a magnitude sufficient to cause the piezoelectric elements to expand;
   (d) a plurality of leads, each being connected to one of the piezoelectric elements and to the source of voltage in a circuit that includes a normally open switch; and
   (e) means for selectively closing the normally open switch to apply an actuating voltage to a selected piezoelectric element causing the piezoelectric element to expand outwardly, the selected piezoelectric element being offset from but proximate to the points at which the edges of the drive and reaction wheels are in contact, the expanding piezoelectric element being operative to provide a thrust against the reaction wheel, the thrust having a component directed tangentially of the radially outer edge of the reaction wheel, thereby causing the reaction wheel to rotate.

8. The piezoelectric motor of claim 7, wherein the piezoelectric elements each include a plurality of piezoelectric crystals cut into flat plates, the plates being stacked, interleaved with a plurality of conductive and insulating layers.

9. The piezoelectric motor of claim 8, wherein the plates are stacked radially about the central axis of the drive wheel.

10. The piezoelectric motor of claim 8, wherein the plates are stacked along the circumference of the drive wheel and wherein the piezoelectric elements are constrained to deflect laterally outward in a radial direction when expanded by the actuating voltage.

11. The piezoelectric motor of claim 7, wherein the drive wheel is fixed and the shaft of the reaction wheel is formed into a crankarm with an offset portion, the offset portion of said shaft being rotatably mounted in alignment with the central axis of the drive wheel, the reaction wheel being thus constrained to roll around the circumference of the drive wheel as the piezoelectric elements are sequentially actuated.

12. The piezoelectric motor of claim 8, wherein the reaction wheel has a plurality of the piezoelectric elements disposed in spaced apart array around its radially outer edge, which are selectively actuated by the means for closing the switch so that they expand radially outward to provide a thrust against the drive wheel.

13. The piezoelectric motor of claim 7, wherein both the drive wheel and the reaction wheel are mounted on rotatable shafts, and the shaft on which the drive wheel is mounted rotates in a direction opposite that of the shaft on which the reaction wheel is mounted as the piezoelectric elements expand.

14. The piezoelectric motor of claim 7, wherein the switch is closed to apply the actuating voltage to the selected piezoelectric element as a function of the angular position of rthe selected piezoelectric element relative to the points at which the reaction and drive wheels are in contact.

15. The piezoelectric motor of claim 7, wherein the switch is closed to apply the actuating voltage to sequentially selected piezoelectric elements to provide a continuous rotation of the reaction wheel on its shaft.

16. A piezoelectric motor comprising:
(a) a first and a second shaft extending parallel to each other, the first shaft being rotatable and including a rotary switch assembly;
(b) a drive wheel mounted on the first shaft;
(c) a reaction wheel, axially and rotatably mounted on the second shaft, adjacent the drive wheel, with a peripheral edge of the reaction wheel contacting a peripheral edge of the drive wheel at a point along a line connecting the centers of the reaction and drive wheels;
(d) a plurality of piezoelectric elements disposed in slots arranged in spaced apart array around the peripheral edge of the drive wheel, each piezoelectric element being electrically connected to one of a plurality of switch contacts in the rotary switch assembly and operative to expand radially outward when energized with a voltage; and
(a) a voltage supply, electrically connected to a brush mounted adjacent the switch contacts in the rotary switch assembly, the brush contacting a specific one of the switch contacts to complete a circuit so that voltage is applied to the piezoelectric element connected to the specific one of the switch contacts, the brush being disposed to energize a piezoelectric element offset from but proximate the line where the peripheral edge of the drive and the reaction wheels are in contact, causing that piezoelectric element to expand outwardly against the peripheral edge of the reaction wheel, forcing the drive wheel and the first shaft to rotate.

17. The piezoelectric motor of claim 16, wherein both the drive wheel and the reaction wheel and the first and second shafts rotate as the piezoelectric elements are sequentially energized by rotation of the rotary switch assembly switch contacts relative to the brush.

18. The piezoelectric motor of claim 16, wherein the piezoelectric elements each comprise a plurality of piezoelectric plates stacked within each slot.

19. The piezoelectric motor of claim 18, wherein the slots extend radially and the piezoelectric plates are stacked in a radial direction.

20. The piezoelectric motor of claim 18, wherein the slots have a greater circumferential extent than a radial extent and wherein the piezoelectric plates are stacked in a circumferential direction.

21. The piezoelectric motor of claim 20, wherein the center of the piezoelectric element bows radially outwardly of the peripheral edge of the drive wheel when energized with the voltage.

* * * * *